Feb. 19, 1952     E. E. SHELDON     2,586,391
DEVICE FOR PROJECTION OF MICROWAVE IMAGES
Filed July 8, 1947
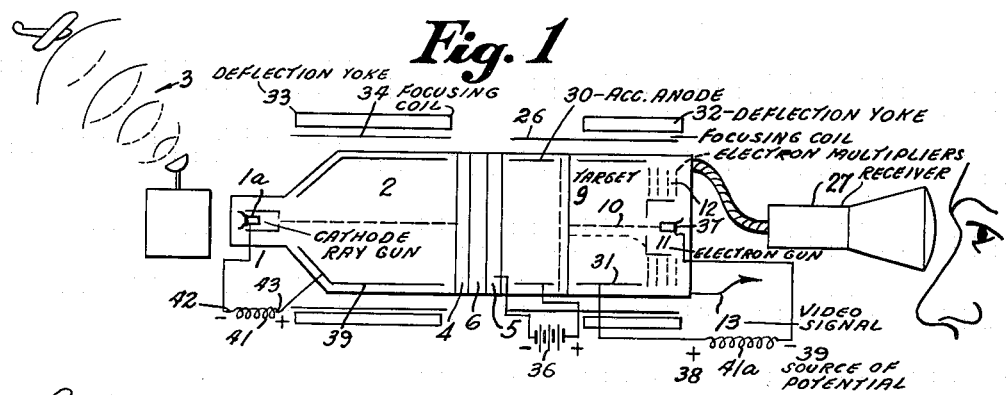
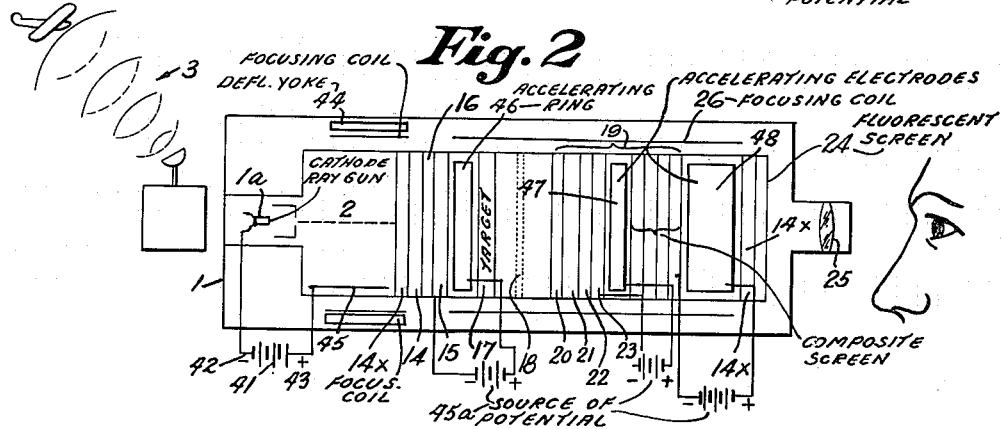
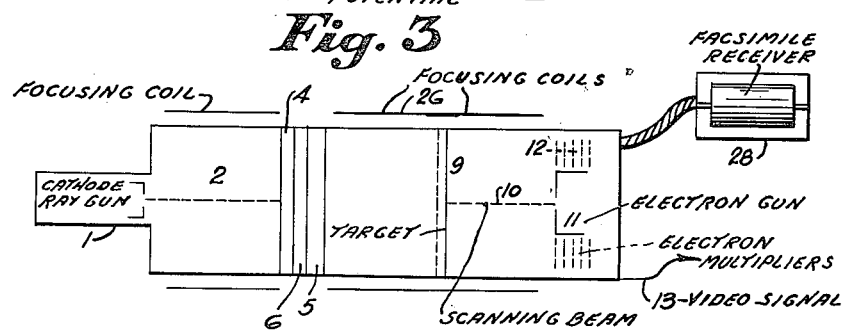
INVENTOR.
EDWARD EMANUEL SHELDON
BY
ATTORNEYS Patented Feb. 19, 1952

2,586,391

UNITED STATES PATENT OFFICE 2,586,391

DEVICE FOR PROJECTION OF MICROWAVE IMAGES

Edward Emanuel Sheldon, New York, N. Y.

Application July 8, 1947, Serial No. 759,531

8 Claims. (Cl. 343—17)

1

This invention relates to an improved method and device for intensifying and magnifying, and televising of images and refers more particularly to method and device for intensifying, magnifying and televising radar images or other microwave images.

One primary object of this invention is to provide a method and device to produce intensified radar or other micro-wave images. This intensification will enable to overcome the inefficiency of the present examinations of radar images of long persistence. At the present level of illumination of the fluorescent radar image of a long persistence the human eye has to rely exclusively on scotopic (dark adaptation) vision, which is characterized by a tremendous loss of normal visual acuity in reference both to detail to the contrast and to the speed of vision. The purpose of this invention is to enable the observer to use his photopic vision, in order to inspect radar images in daylight.

Another object of this invention is to make it possible to obtain enlarged radar images for examination by many person simultaneously.

Another object of this invention is to increase the sensitivity of radar image receivers to the radar signals.

Still another object is to provide more contrasting radar images than was possible until now.

The present intensifying devices concerned with reproduction of radar images were completely unsatisfactory, as in the best of the amplification of the original image brightness of the order of 20-30 was achieved by increasing kv. of radar tube, while in order to obtain improvement in the visual acuity intensification of the brightness of the order of 1000 is obligatory. Without intensification of luminosity of at least of the order of 1000 the eye is confined to so-called scotopic vision at which it is not able to perceive well definition and contrast of the fluorescent radar image. It is well known that such intensification of the brightness of the radar fluorescent persistent images cannot be achieved by increase of energy of cathode rays beam in the radar tube. Therefore, to obtain the objects of this invention a special radar tube had to be designed.

At present the most sensitive televising pick-up system proved to be insufficiently sensitive for pick-up of persistent radar images from the cascade screen. The luminosity of cascade screens is 0.003–0.01 mL. and the light from the screen incident on the photocathode after the passage through the focussing optical system is only 1/20 of the original intensity, while the most sensitive pick-up television tubes can operate only at light intensity above 0.01 mL. of incident light. The novel radar tube which can accomplish the purposes of this invention is shown in Figure 1. The electron gun 1 produces beam of electrons 2 which is modulated by radar signals 3 and produces their fluorescent image on the fluorescent layer 4 of the composite screen 4—6—5. The fluorescent layer 4 is coated with a photoemissive layer 5 and with a thin light transparent chemically inactive barrier layer between them 6. This composite screen acts as a photo-cathode of the pick-up system which transforms radar image into electron image and transmits it either by radio waves or by coaxial cable to the final receiver with the desired intensification and magnification. It is obvious, therefore, that the elimination of the optical system resulting in 20-30 fold gain of the light falling upon photo-cathode and securing the necessary amount of light for satisfactory operation of the pick-up system with a good signal to noise ratio represents an important feature of this invention.

Further improvement of the operation of this novel radar tube can be obtained by the use of a proper kv. and the use of a thin layer of aluminum positioned on the surface of the composite screen 4—6—5 nearest the cathode ray beam modulated by the radar signals, to increase by reflection the transfer of light to the photoemissive surface.

This invention will appear more clearly from the following detailed description when taken in connection with the accompanying drawings by way of example only preferred embodiments of the inventive idea.

Reference will now be made to Figure 1, which illustrates the new tube to accomplish the purposes outlined above.

The radar or other micro-wave signals 3 activate and modulate cathode ray beam 2 from the electron gun 1. The cathode 1a of the electron gun 1 is provided with a negative potential. The second anode 39 may be in the form of a conducting coating on the inside surface of the tube envelope and is supplied with a positive potential in relation to the potential of the cathode of the electron gun. The proper operating potentials may be applied to the electrode of the electron gun from potential source 41. Between its terminals 42 and 43 a potentiometer or a bleeder resistance may be connected in order that the relative potentials of the various electrodes may be properly selected. The horizontal and vertical scanning motion of the electron beam 2 across the fluorescent layer 4 is provided by the deflection yoke 33 having a horizontal and a vertical deflection coil. The deflection coils are energized by a cyclically varying current of a suitable wave form which may be obtained from a horizontal deflection generator and from a vertical deflection generator. Deflection generators are well known in the art and are therefore not shown in the drawings. The cathode ray beam transforms the radar signals into visual pattern on the fluorescent layer 4 of the composite screen 4—6—5 which represents a photocathode of the pick-up system. The visual image is transformed into photoelectron image in the photoemissive layer 5 of the composite screen which is in close apposition to the fluorescent layer 4, as otherwise the loss of definition would be of such a degree that the sharpness of the image would be destroyed. It is also necessary to include between the fluorescent and photoemissive layers a light transparent very thin barrier layer 6 such as e. g. of mica, glass, organic materials, or of plastic to prevent chemical interaction. This arrangement results in 20—30 fold increase in light available on the photocathode, as compared with the present optical systems for focussing the radar image on the photocathode. This pick-up system can be applied in tubes operating on deflection modulation as well as on intensity or velocity modulation principle, in tubes of electrostatic or of magnetic type, or in tubes of any television system desired.

The fluorescent layer of composite screen can be of cascade type such as e. g. ZnS—Ag on ZnS:CdS:Cu or Al$_2$O$_3$ on ZnS:Ag or of single layer type such as e. g. Zn(Mg)F$_2$:Mn or ZnSCu(Ag); Cs$_2$P$_2$O$_7$:D$_y$ or ZnS—CdS:AgCu.

The satisfactory photoemissive substances would be e. g. cesium oxide, cesium oxide with silver, potassium, lithium or cesium on antimony or bismuth. The fluorescent and photoemissive layers should be so correlated that under the influence of the cathode rays there is obtained maximum photoemissive effect. Between the photoemissive layer 5 of the composite screen and the storing target 9 is an accelerating anode or ring 30 which may be in the form of a conducting coating on the inside surface of the tube envelope. This conducting surface is maintained positive with respect of the photoemissive surface 5 by means of a source of potential 36. The photoelectrons from the photoemissive layer 5 are focused upon the target 9 by means of magnetic or electromagnetic coil 26 which surrounds the major portion of the entire tube. The photoelectron image of radar signals is now focussed by means of magnetic fields on the target 9 which is scanned by slow electron beam 10 from the cathode ray gun 11. The electron gun 11 produces the electron beam for scanning the target 9. The cathode 37 of the gun is maintained at a negative potential. The first and second anode 31 are supplied with a positive potential in respect to potential of the cathode of the gun. The second anode may be in the form of a conducting coating on the inside surface of the tube envelope. The proper operating potentials may be applied to the electrodes of the electron gun from the potential source 41a.

Between its terminals 38 and 39 a potentiometer or a bleeder resistance may be connected in order that the relative potentials of various electrodes may be properly selected. The scanning rate can be changed in case of long persistence of radar images to get advantage of a longer storage effect which results in a marked gain in signal to noise ratio and represents another important advantage of this novel tube.

The focussing and deflecting elements for controlling the electron beam 2 and 10 are not indicated in detail as they are well known in the art. The electron image from the target 9 after multiplication by multi-stage multipliers 12 is converted into video signals 13 which after amplification may be sent either by high frequency system or by coaxial cable to the final receiver. In the final receiver 27 the radar image can be intensified by any degree desired so that the observer can inspect it in daylight, or may be photographed or may be recorded by means of facsimile 28 system, see Figure 3.

Another advantage of this invention is that the radar image in the final receiver may be magnified by electron optical system which is not shown in the drawing since it is well known in the art, to the desired degree so that it can be inspected by many observers, or it may be projected on a special viewing screen by Schmidt optical system with a desired magnification.

The contrast of radar image can be markedly increased in the final receiver by means of non-linear high gamma amplification in the amplifier system of the receiver.

In alternative of this invention the intensification and magnification of radar or other microwave images was accomplished by means of another novel image tube, which is shown in Figure 2. The electron gun 1 produces beam of electrons 2 which is modulated by radar signals 3 and produces their fluorescent image on the fluorescent layer 14 of the composite screen 14x—14—16—15. The cathode of the electron gun 1 is provided with a negative potential. The second anode 45 may be in the form of a conducting coating on the inside surface of the tube envelope and is supplied with a positive potential in relation to the potential of the cathode of the electron gun. The proper operating potentials may be applied to the electrons of the electron gun from the potential source 41. Between its terminals 42 and 43 a potentiometer or a bleeder resistance may be connected in order that the relative potentials of the various electrodes may be properly selected. The horizontal and vertical scanning motion of the electron beam 2 across the fluorescent layer 4 is provided by the deflection yoke 44 having a horizontal and a vertical deflection coil. The deflection coils are energized by a cyclically varying current of a suitable wave form which may be obtained from a horizontal deflection generator and from a vertical deflection generator. Deflection generators are well known in the art and are therefore not shown in the drawings. The fluorescent layer is coated with electron pervious light reflecting layer 14x on the side of electron beam 1 and with a photoemissive layer 15 on the opposite side. A thin light transparent chemically inactive barrier layer 16 is placed between the fluorescent and photoemissive layers to prevent their chemical interaction. This composite screen represents a photocathode of the pick-up section of intensifying system which transforms radar or micro-wave image into electron image and transmits it to the final viewing screen 24 in the same vacuum tube with desired intensification and magnification. Therefore, this novel radar tube is characterized by elimination of the optical lens system present in other image tubes, which resulted in 20 fold gain in the light reaching the photocathode from the radar screen. This gain of incident light allowed to activate the intensifying system, described below, which was impossible before as with the amount of light available after the passage through the focussing optical system the signal to noise ratio was too low for satisfactory results.

The fluorescent 14 and photoemissive layers 15 should be so correlated that under the influence of the cathode rays there is obtained a maximum output of photoemission. Fluorescent substances for cascade screens that may be used are ZnS—Ag on ZnS:CdS:Cu or $Al_2O_3$ on ZnS:Ag or of single layer type such as e. g. $Zn(Mg)F_2$:Mn or ZnSCu(Ag); $Cs_2P_2O_7$:Dy or ZnS—CdS:Ag:Cu. The satisfactory photoemissive materials will be a caesium oxide, caesium oxide activated by silver, caesium with antimony, or antimony with lithium or potassium. The barrier layer 16 between the fluorescent and photoemissive surfaces can be an exceedingly thin transparent film of mica, $ZnF_2$ or of a suitable plastic.

Further, the photoemissive pick-up section was designed to improve its efficiency. The previous intensifying tubes used photoemissive layers of an insulated mosaic type. In my tube the insulating mosaic is replaced with the photoemissive layer of semi-transparent type. This layer is characterized by emission of electrons on the side opposite to the side of the incident light. The photo electrons emitted from the photoemissive layer in a pattern corresponding to the incident light pattern are focussed by means of magnetic and/or electric fields on the target 17 which serves as a secondary emission electrode and electron storage place. This division of the photo-surface into photo-emissive section and secondary emission-storage section allows to obtain many-fold gain in efficiency as compared with the mosaic type of photoemissive surfaces where both photoemissive action and storage action are combined in one layer. In some cases it may be desirable to use a cooling system for a photocathode and secondary emission electrode to inhibit thermionic emission. Between the photoemissive layer 15 of the composite screen and the target 17 is an accelerating anode or ring 46 which may be in the form of a conducting coating on the inside surface of the tube envelope. This conducting surface is maintained positive with respect of the photoemissive surface 15 by means of a source of potential 45. The photoelectrons from the photoemissive layer 15 are focused upon the target 17 by means of magnetic or electromagnetic coil 26 which surrounds the major portion of the entire tube.

The previous combinations of fluorescent and photoemissive layers were not successful because of detrimental chemical interaction of both layers, due to lack of a barrier between them.

Further intensification of the radar image was obtained by the use of novel image amplification system. The amplification section of the tube 19 consists of one or a few screens, each of them composed of a very thin, light-reflecting, electron previous layer 20 of fluorescent layer 21 and of photoemissive layer 23 in close apposition to each other. It is important to include a thin light transparent chemically inactive barrier layer between the fluorescent and photoemissive layers 22. The light reflecting layer 20 may be omitted in low voltage tubes. The electrons from the pick-up section of the image tube are focussed by magnetic or electro-static fields on the fluorescent layer of an amplifying screen described above. The luminescence of the fluorescent layer of the amplification screen will cause the emission from the photoemissive layer of the screen. This process can be repeated a few times, using a few screens described above, resulting in marked intensification of the original electron image. The accelerating electrodes 47 serve to accelerate photoelectrons from the photoemissive layer 23 on the next composite screen. The accelerating electrode 48 serves to accelerate photoelectrodes from the composite screen to the fluorescent screen 24. The accelerating electrodes may be in the form of ring-electrodes or in the form of conducting coating on the inside surface of the glass envelope. The accelerating electrodes are provided with a positive potential from an external source of power, as described above.

In another variety of intensification to be used in this invention there is an additional multiplier section 18 which consists of a few stages of multipliers.

The electrons leaving the amplifying section are considerably accelerated by means of high voltage electrostatic fields. The accelerating system can be of a conventional type well known in the art. Much better results with higher voltages will be achieved with an electrostatic multi-lens system.

Next the electron image may be demagnified if its additional intensification is desired. The electron diminution of the image, in order to gain its intensification is well known in the art, therefore does not have to be described in detail.

The diminished electron image is projected on the fluorescent screen at the end of the tube 24, where it can be viewed by the observer directly or by means of an optical magnifying eye piece 25 or may be photographed. The use of an optical eye piece to magnify optically the electronically diminished image appearing on the fluorescent screen, is also well known in the art, therefore does not need further description.

On the other hand, if magnification of the radar image is needed it can be accomplished by electron optical means. The available energy of the electron image will allow 20–30 times magnification of the image with still sufficient luminosity of the fluorescent image.

The combination of the above described features of the novel tube allows to obtain a marked intensification of the original radar or other microwave image; therefore, it will be possible now to use a much finer grain of fluorescent screens 14 and 16 than was practical until now and to improve this way the detail and contrast of the final image, which was another purpose of this invention.

The focussing and accelerating magnetic and/or electrostatic fields are not indicated in detail since they are well known in the art and would only serve to complicate the illustration.

Although particular embodiments and forms of this invention have been illustrated, it is understood that modifications may be made by those skilled in the art without departing from the true scope and spirit of the foregoing disclosure.

What is claimed is:

1. A device for intensifying and magnifying microwave images comprising, in combination, a microwave source, a pick-up tube having means for producing a cathode ray beam modulated microwave signals, and for scanning with said beam a composite screen consisting of a fluorescent layer and a photoemissive layer, producing thereby photoelectron image having the pattern of said microwave image, means for converting said photoelectron image into video signals, and amplifiers and receivers to re-convert said video signals into visible images.

2. In a device, as defined in claim 1, said composite screen consisting of a light reflecting layer, fluorescent layer, light transparent layer and photoemissive layer.

3. In a device, as defined in claim 1, said composite screen consisting of a fluorescent layer, a light transparent separating layer, and a photomissive layer.

4. In a device, as defined in claim 1, the fluorescent layer in said composite screen consisting of a plurality of various phosphors adjacent to each other.

5. A device for intensifying and magnifying microwave images, comprising, in combination, a microwave source, a pick-up tube having means for producing a cathode ray beam modulated by said microwave images and for scanning with said beam a composite screen consisting of a fluorescent layer, a photoemissive layer emitting electrons, and producing thereby photo-electron image having the pattern of said microwave image, means for accelerating said electrons and an electron reactive screen disposed within said tube for receiving said accelerated electrons.

6. In a device, as defined in claim 5, said composite screen consisting of a light reflecting layer, a fluorescent layer, a light transparent separating layer, and a photoemissive layer.

7. In a device, as defined in claim 5, said composite screen consisting of a fluorescent layer, a light transparent separating layer, and a photoemissive layer.

8. In a device, as defined in claim 5, the fluorescent layer in said composite screen consisting of a plurality of various phosphors adjacent to each other.

EDWARD EMANUEL SHELDON.

REFERENCES CITED

The following references are of record in the file of this patent:

UNITED STATES PATENTS

| Number | Name | Date |
| --- | --- | --- |
| 1,720,654 | Wein | July 9, 1929 |
| 2,153,614 | Coeterier | Apr. 11, 1939 |
| 2,155,471 | Cawley | Apr. 25, 1939 |
| 2,158,853 | Coolidge | May 16, 1939 |
| 2,198,479 | Langmuir | Apr. 23, 1940 |
| 2,237,679 | Lubszynski | Apr. 8, 1941 |
| 2,244,720 | Massa et al. | June 10, 1941 |
| 2,248,977 | Flory et al. | July 15, 1941 |
| 2,428,351 | Ayers | Oct. 7, 1947 |

FOREIGN PATENTS

| Number | Country | Date |
| --- | --- | --- |
| 315,362 | Great Britain | July 24, 1929 |